United States Patent
Waffler et al.

(10) Patent No.: US 11,292,609 B2
(45) Date of Patent: Apr. 5, 2022

(54) INFORMATION PROJECTION AND CONTROL SYSTEM

(71) Applicant: AIRBUS HELICOPTERS DEUTSCHLAND GMBH, Donauworth (DE)

(72) Inventors: Daniel Waffler, Donauworth (DE); Uwe Renner, Friedberg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 235 days.

(21) Appl. No.: 16/782,294

(22) Filed: Feb. 5, 2020

(65) Prior Publication Data

US 2020/0290751 A1 Sep. 17, 2020

(30) Foreign Application Priority Data

Mar. 14, 2019 (EP) ..................................... 19400009

(51) Int. Cl.
*B64D 45/00* (2006.01)
*B64C 1/14* (2006.01)

(52) U.S. Cl.
CPC .......... *B64D 45/0029* (2019.08); *B64C 1/143* (2013.01); *B64C 1/1461* (2013.01); *B64D 45/0053* (2019.08); *B64D 2045/007* (2013.01)

(58) Field of Classification Search
CPC ............ B64D 45/0029; B64D 45/0015; B64D 45/0053; B64D 2045/007; B64C 1/143; B64C 1/1461
See application file for complete search history.

(56) References Cited

U.S. PATENT DOCUMENTS

| 9,616,802 | B1 | 4/2017 | Kiriyama et al. |
| 10,176,368 | B1 * | 1/2019 | Ramakrishnan ........ E05B 81/78 |
| 2006/0145825 | A1 * | 7/2006 | Me ........................ B60R 25/305 |
| | | | 340/426.35 |
| 2007/0171053 | A1 | 7/2007 | Heppeler |
| 2013/0318873 | A1 * | 12/2013 | Knijnenburg ........... E05F 15/70 |
| | | | 49/31 |

(Continued)

FOREIGN PATENT DOCUMENTS

| DE | 102011004400 A1 | 8/2012 |
| EP | 1785963 A2 | 5/2007 |

(Continued)

OTHER PUBLICATIONS

European Search Report for European Application No. EP 19400009.7, Completed by the European Patent Office, dated Aug. 26, 2019, 7 pages.

*Primary Examiner* — Tye William Abell
(74) *Attorney, Agent, or Firm* — Brooks Kushman P.C.

(57) ABSTRACT

An information projection and control system for projecting information onto a projection area provided by a vehicle door, comprising at least one control unit that generates information, for projection onto the projection area; at least one projection device that projects the generated information onto the projection area; and at least one movement sensor that detects movements in a sensing area associated with the projection area, wherein the at least one control unit is adapted to control generation of the generated information on the basis of the detected movements.

14 Claims, 5 Drawing Sheets

(56) References Cited

U.S. PATENT DOCUMENTS

2016/0090196 A1    3/2016   Besettes et al.
2017/0050744 A1    2/2017   Bredemeier et al.
2017/0182933 A1*   6/2017   Kiriyama ............. B60Q 1/0023

FOREIGN PATENT DOCUMENTS

| EP | 2108585 A1 | 10/2009 |
| EP | 2741171 A1 | 6/2014 |
| EP | 3133018 A1 | 2/2017 |
| WO | 2014167038 A1 | 10/2014 |

* cited by examiner

INFORMATION PROJECTION AND CONTROL SYSTEM

CROSS-REFERENCE TO RELATED APPLICATIONS

This application claims priority to European patent application No. EP 19400009.7 filed on Mar. 14, 2019, the disclosure of which is incorporated in its entirety by reference herein.

BACKGROUND OF THE INVENTION

(1) Field of the Invention

The invention is related to an information projection and control system for projecting information onto a projection area. The invention is further related to an aircraft with at least one aircraft door that comprises such an information projection and control system, as well as to a method of operating such an information projection and control system in an aircraft having a plurality of aircraft doors.

(2) Description of Related Art

A conventional information projection and control system may e.g. be used in an aircraft in order to provide indications with respect to a current status of a given aircraft door. These indications are intended to prevent operation of the aircraft door if the operation is not possible without a hazard for an operator or persons in the proximity of the aircraft door. By way of example, operation without a hazard may not be possible if a cabin pressure level inside of the aircraft is higher than a respective outer pressure, or if the aircraft door is placed in a so-called "armed" state.

More generally, prior to departure of an aircraft, in particular of a large passenger aircraft, a respective cabin crew usually switches all aircraft doors into an "armed" state. Thus, if an emergency situation occurs and evacuation of the aircraft is required while the aircraft doors are in the "armed" state, opening of the aircraft doors results in deployment of associated emergency slides, which expand out of respective slide containers. In fact, the emergency slides will automatically be triggered to deploy as soon as opening of the aircraft doors in "armed" state is started.

If, however, an operator of the aircraft door attempts to open a given aircraft door in a normal situation, i.e. without being in an emergency situation that requires evacuation of the aircraft, then an inadvertent emergency slide deployment would occur if the aircraft door is in the "armed" state. Such an inadvertent emergency slide deployment may be initiated by trained cabin crew or by other persons, such as ground or maintenance staff, and usually go along with high follow-up-costs, which have become a burden for airlines in recent years. In fact, each inadvertent emergency slide deployment generally induces costs in the six-digit range, and of course heavy trouble in flight schedules.

More specifically, although dedicated visual and/or acoustic warnings are usually provided in order to prevent an inadvertent emergency slide deployment, operation of the aircraft door in "armed" state cannot be rendered impossible as otherwise opening of the aircraft door in the emergency situation would no more be possible. Thus, despite the dedicated visual and/or acoustic warnings, inadvertent door openings and, thus, inadvertent emergency slide deployments may occur, usually as a result of unfavorable human factors such as disregard of the visual and/or acoustic warning signals due to missing attention or decreased concentration in repeatedly performed routine tasks. These human factors may e.g. be the result of a comparatively high time pressure or high workload of a respective operator, frequently occurring ad hoc situations that lead to deviations from standard procedures in the aircraft, as well as service of operators in different aircraft types within shortest periods (so-called mixed fleet flying). In order to reduce the human factors and to prevent, or at least minimize, inadvertent emergency slide deployments, aircrafts are frequently equipped with dedicated assistance systems.

Document EP 2 108 585 A1 describes a system for preventing inadvertent emergency slide deployment for an aircraft. The system comprises a sensor for sensing the proximity of a person in front of an aircraft door, and an optical warning and information means operable to provide an optical indication in the vicinity of an emergency slide arming lever when the sensor detects the proximity of a person in front of the aircraft door. The optical warning and information means can be realized by means of projectors. A respective projector can be located outside the aircraft door in its direct vicinity or may be located within the door projecting towards an inner surface, wherein this surface may be translucent or equipped with a screen area. The optical warning and information means can include signs with one or more easy-to-understand symbols that direct the door operator towards the emergency slide arming lever. By providing optical warnings/information, the operator is warned in sufficient time before the handle is gripped. The optical warnings do not need to be static, they can also be animated or flashing.

However, this system for preventing inadvertent emergency slide deployment for an aircraft is merely provided with a kind of ON/OFF feature that is implemented dependent on an output signal of the sensor, which either detects proximity of a person in front of the aircraft door, or not. If proximity of a person is not detected, this corresponds to an OFF state wherein no optical indication is displayed. If, however, proximity of a person is detected, this corresponds to an ON state wherein an optical indication is displayed in the vicinity of an emergency slide arming lever of the aircraft door. Nevertheless, as the optical indication is only displayed in the ON state and in the vicinity of the emergency slide arming lever, the optical indication may be disregarded by an operator of the aircraft door, so that an inadvertent door opening and, thus, an inadvertent emergency slide deployment may still occur, in particular e.g. in situations, where the operator is distracted, in stress situations, or in moments of high time pressure.

Document EP 3 133 018 A1 describes an aircraft door with a door trim or lining that faces the interior of the aircraft fuselage. If the aircraft is located on a runway or in a parked position, the door is opened from the inside of the aircraft. An indicating device is integrated on or into the door trim, wherein a visible side faces the interior of the aircraft. If a person is in front of the door, the person is within the detection zone of a sensor that monitors a space inside the aircraft and there defines a detection zone. An electronics unit may, for example, define a first limit distance as well as a second limit distance, wherein the electronics unit operates an optical signal device as soon as a person comes closer than the first limit distance and wherein an acoustic signal device is operated as soon as a person comes closer than the second limit distance. If a person is located between the two limit distances, the person is only made aware optically, for example by a flashing light, to the fact that the emergency slide is still activated. If the person comes closer to the door, an additional acoustic signaling is performed if the distance to the door is close to an arm's length. Furthermore, provision is made that the electronics unit operates the optical signal device and the acoustic signal device so as to emit a continuous light or a continuous warning sound, respectively, if the door opening lever is moved a predetermined distance towards the door-open position while the emergency slide is armed.

However, similar to what is already described above, this indicating device is also merely provided with a kind of ON/OFF feature that is implemented dependent on an output signal of the sensor, which either detects a person within the detection zone in front of the aircraft door, or not. If no person is detected, this corresponds to an OFF state wherein no optical signal is emitted. If, however, a person is detected in the detection zone, this corresponds to an ON state wherein an optical signal, such as a flashing light, is emitted. Nevertheless, as only in the ON state the optical signal is emitted, the optical indication may be disregarded by an operator of the aircraft door, in particular e.g. in situations, where the operator is distracted, in stress situations, or in moments of high time pressure.

Document WO 2014/167038 A1 describes a system that is provided to produce a display of the environment of an aircraft by means of live shooting. More specifically, a window is replaced with a camera lens and an illumination of the environment in suitable radiation ranges. The camera lens is connected to a display screen. More specifically, the system for displaying the environment of an aircraft comprises, in a door provided with a locking and opening system, at least one illumination source illuminating areas of the environment in at least one radiation range, at least one video camera provided with a lens capable of capturing the external environment illuminated by the illumination source in order to provide a video signal, and at least one display screen connected with the camera for receiving the video signal. The camera, the illumination source and the display screen are linked to a calculation unit capable of receiving information concerning the state of operation of the aircraft equipment and display parameters of said environment.

However, this system that is provided to produce a display of the environment of an aircraft by means of live shooting and using at least one video camera operates completely independent of events occurring in the interior of the aircraft.

Document EP 1 785 963 A2 describes a monitoring unit that is provided to monitor whether an object is present in a predefined area of an evacuation route in a public building, the term "object" referring to physical objects in addition to persons. The predefined area is monitored by a monitoring unit to secure an escape door of the public building from unauthorized opening, i.e., a respective escape door security area is expediently predefined in such a way that a person who wishes to actuate and pass the escape door must pass this area. More specifically, an escape door is provided with an associated evacuation route monitoring system, which is situated near the escape door. The evacuation route monitoring system outputs illumination of an alarm light and also projection of a visual warning notification as a visual warning signal if a person passes the respective escape door security area. The visual warning notification is projected onto the escape door and a respective projector is situated at a distance from an associated control unit and is connected thereto using a cable. The projector is situated above the escape door. The evacuation route monitoring system further comprises an access control unit, which is implemented to transmit and receive signals. If a person having an access authorization in the form of a transponder corresponding to the access control unit comes into proximity to the access control unit, this unit recognizes that an authorized person has arrived by detecting the transponder and transmits this to an associated control unit that, then, ensures that the visual warning signals are suppressed when this person steps into the escape door security area.

However, similar to what is already described above, this evacuation route monitoring system, which is situated near the escape door, is also merely provided with a kind of ON/OFF feature that is implemented dependent on an output signal of the monitoring unit, which either detects a person within the respective escape door security area in front of the escape door, or not. If no person is detected, this corresponds to an OFF state wherein no visual warning notification is displayed. If, however, a person is detected in the respective escape door security area of the escape door, this corresponds to an ON state wherein a visual warning notification is displayed. Nevertheless, in any case the escape door is not useable as a vehicle door, as it is provided in an escape route of a public building.

BRIEF SUMMARY OF THE INVENTION

It is, therefore, an object of the present invention to provide a new information projection and control system for projecting information onto a projection area of a vehicle door, which provides for an improved visibility and recognizability of warnings and indications and which is suitable for displaying accurate in-time warnings and instruction information. Further objects of the present invention relate to providing an aircraft having such a new information projection and control system, as well as a method of operating such a new information projection and control system. In any case, the new information projection and control system is preferably suitable, when used in an aircraft for projecting information onto a projection area of an aircraft door, to assist prevention of inadvertent emergency slide deployment by interdicting door operation when the aircraft door is in "armed" state. Furthermore, the new information projection and control system is preferably cost effective and easy to retrofit.

The object of the present invention is solved by an information projection and control system comprising a control unit that generates information for projection onto a projection area, a projection device that projects the generated information onto the projection area, and a movement sensor that detects movements in a sensing area associated with the projection area, wherein the control unit is adapted to control generation of the generated information on the basis of the detected movements. The further objects of the present invention are solved by an aircraft with such an information projection and control system, and by a method of operating such an information projection and control system.

More specifically, the present invention provides an information projection and control system for projecting information onto a projection area provided by a vehicle door. The information projection and control system comprises at least one control unit that generates information for projection onto the projection area, at least one projection device that projects the generated information onto the projection area, and at least one movement sensor that detects movements in a sensing area associated with the projection area. The at least one control unit is adapted to control generation of the generated information on the basis of the detected movements.

It should be noted that in the context of the present invention the term "movement sensor" refers to any means that are suitable to detect movements. Thus, a movement sensor should be understood more broadly as any kind of detecting means that is applicable for detecting movements.

According to one aspect, the generated information is permanently projected onto the projection area provided by the vehicle door of a given vehicle. However, by controlling generation of the generated information on the basis of the detected movements, a situation-specific adjustment and/or modification of the respectively projected information is enabled in order to allow for an improved display of suitable in-time warning and instruction information using the projection device, while enabling to highlight a respectively most important information for an operator of the vehicle at an ergonomically improved position on the vehicle door, at a precise moment depending on the situation.

Advantageously, by detecting movements in the sensing area and by controlling generation of the generated information on the basis of the detected movements, even complex control tasks may be performed using the inventive information projection and control system. For instance, interactive user guidance through a control menu may be implemented wherein an operator of the vehicle door may navigate through the control menu step-by-step for performing e.g. control tasks with respect to the vehicle door, or even independent of the vehicle door. In other words, a complex gesture control system may advantageously be provided. Alternatively, or in addition, navigation through information and/or advertising menus may also be enabled, and so on.

According to one aspect, the inventive information projection and control system may be implemented using an artificial intelligence platform. Such an artificial intelligence platform may advantageously improve adequacy and accuracy of the inventive information projection and control system and enable implementation of features going beyond mere gesture control, such as e.g. voice control features and so on.

The projection device may be mounted on the vehicle door or near the vehicle door. It may also be provided on an opposing vehicle door or any other suitable location that allows projection of the generated information on the vehicle door. By way of example, if the vehicle is an aircraft, the projection device may be mounted on a respective aircraft door or on a fuselage side of the aircraft. The projection device may comprise any suitable light source, e.g. a light source in the form of a LED or a laser.

Advantageously, the inventive information projection and control system is configured such that it may reach every location on the vehicle door, especially those locations which are eligible for best visibility or which are adjacent to particular operating devices of the vehicle door. For information or instruction purposes, any vehicle door or lining surface may be used as projection area. Furthermore, any pictures, symbols, text, videos, live pictures adapted to a current condition of the vehicle door, such as e.g. an operation sequence, ergonomic aspects such as position and height of the operator, and information related to an associated control unit of the vehicle door, may be projected onto the projection area.

According to one aspect, the at least one control unit of the inventive information projection and control system controls the projection device such that color and brightness of currently projected information is adjusted with respect to the environment of the vehicle door for improved recognizability and convenience. For warning purposes, such adjustments may also be supplemented e.g. by highly visible light symbols/effects, such as e.g. a flashing red cross over a control lever which should not be operated, or by projecting e.g. green arrows, check marks or "OK" letters on operating elements that can be operated.

Advantageously, the at least one movement sensor allows detection of predetermined objects relative to the projected information of the projection device. Thus, e.g. finger and/or hand movements may be detected and used for control purposes. By way of example, these control purposes may comprise control of the generated information and/or e.g. confirmation of a showed instruction or warning. According to one aspect, if the vehicle door is a door that is electrically operable, respective finger and/or hand movements may be detected in order to trigger or stop any electrified feature of the vehicle door simply by gestures at a defined position/place with respect to the vehicle door.

According to one aspect, the at least one control unit is adapted to control operation of the vehicle door in response to the detected movements.

The at least one control unit may be adapted to adjust projection parameters of the at least one projection device, in particular color, contrast and/or brightness, dependent on environmental conditions currently prevailing in respective surroundings of the vehicle door, in particular visibility and luminosity.

Preferably, the at least one projection device is mounted to the vehicle door.

The generated information may comprise pictures, symbols, text, videos and/or live pictures.

Preferably, the generated information is related to at least one of a vehicle door status, entertainment and advertisement, a seat number scheme, instructions for passengers, or operation of the vehicle door.

The generated information may also be related to maintenance of the vehicle door, in particular to dismantling and/or assembly instructions for the vehicle door.

The information projection and control system may comprise at least one camera that is adapted to monitor respective surroundings of the vehicle door.

The vehicle door may comprise associated blocking and locking components which are electrically operable in response to the detected movements.

According to one aspect, the at least one control unit is connected to at least one first and one second vehicle door and adapted to generate information related to the first vehicle door for display on the second vehicle door.

The vehicle door may be an aircraft door, in particular a cabin access door of an aircraft.

The aircraft door is preferably associated with an emergency slide, and the generated information is preferably intended to interdict opening of the aircraft door in normal operation mode of the aircraft as long as the emergency slide is in armed state.

According to one aspect, the at least one control unit is adapted to prevent the opening of the aircraft door in normal operation mode of the aircraft as long as the emergency slide is in the armed state, independent of the detected movements.

The present invention further provides an aircraft with at least one aircraft door that comprises at least one information projection and control system as described above.

Advantageously, the information projection and control system improves visibility and recognizability of projected information, such as warnings and indications concerning a current door status, in the inventive aircraft. Thus, inadvertent deployment of emergency slides, which is one of the most cost intensive misuses of an aircraft door, may be reduced significantly. Furthermore, also an opening of the aircraft door at high cabin pressure but ignored residual pressure warning may be prevented. Both scenarios occur regularly in aviation and are potentially dangerous to life and aircraft.

The information projection and control system of the inventive aircraft is beneficially more observed and more focused than conventional systems and will significantly decrease occurrence of the above-described dangerous and cost intensive scenarios. Advantageously, the information projection and control system of the inventive aircraft is highly flexible concerning generated content of information and chosen graphic design of the projected information on the aircraft door. A respective shape of projection can be defined by a masking device, e.g. having the shape of a common aircraft window or any other. Furthermore, or alternatively, e.g. information related to a current status of door condition, entertainment and advertisement, information for seat numbers, passenger information and door operation of the aircraft door or all other aircraft doors in the inventive aircraft can be visualized and realized. In a more extensive version of the information projection and control system, even maintenance information related to the aircraft door in the inventive aircraft may be projected and shown to support any dismantling and assembly actions at the aircraft door in the same manner as it is already used during manufacturing.

Advantageously, integration of the information projection and control system in the inventive aircraft may lead to significant savings in cost, weight and complexity with respect to door design and manufacturing. Depending on a respectively applied design assurance level of the information projection and control system, more or less elements of a respective aircraft door can be replaced compared to a conventional aircraft door.

More specifically, in a low assurance level variation the information projection and control system may be provided as an add-on system for improving safety and comfort of use of a given aircraft door. In fact, even conventional warning and instruction placards may still be used, e.g. as aftermarket equipment. In contrast thereto, in a high assurance level variation of the information projection and control system, various conventionally employed components may be replaced beneficially, such as e.g. slide armed warning lights, residual pressure lights, open/close buttons, mechanical or electrical inner indications, etc.

Advantageously, if the aircraft door is functionally electrified, i.e. if the aircraft door is e.g. equipped with blocking and locking components which are electrically operable, then the information projection and control system may be provided with associated control features that are suitable to eliminate mechanical control devices, e.g. levers and handles, as well.

Moreover, a respective interface to the aircraft door and door lining can be simplified significantly, as already a more or less flat surface with a defined roughness can be used as projection area. On the other hand, very few mechanical interfaces for attaching electrical equipment as well as dedicated electrical harnesses will be needed.

Furthermore, if the information projection and control system of the inventive aircraft comprises dedicated sensors or is connected to already available aircraft systems, then also respective door windows of the aircraft door, as well as corresponding efforts in structure, insulation and lining side, may be economized. More specifically, the information projection and control system may be provided with a video camera that is used to show an outside view in adjustable format and size, and which may be displayed almost anywhere on the aircraft door based on predetermined ergonomic properties.

According to one aspect, an additional indoor-camera may be positioned in front or in the proximity of the aircraft door in order to enable cabin crew of the inventive aircraft to easily supervise the aircraft door area, e.g. from each other door area or even from the cockpit.

The present invention also provides a method of operating an information projection and control system as described above in an aircraft having a plurality of aircraft doors, wherein the information projection and control system is associated with at least one aircraft door of the plurality of aircraft doors. The method comprises: Using the at least one control unit of the information projection and control system to generate information for projection onto the projection area of the at least one aircraft door; using the at least one projection device of the information projection and control system to project the generated information onto the projection area of the at least one aircraft door; using the at least one movement sensor of the information projection and control system to detect movements in a sensing area associated with the projection area of the at least one aircraft door; and controlling generation of the generated information on the basis of the detected movements.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
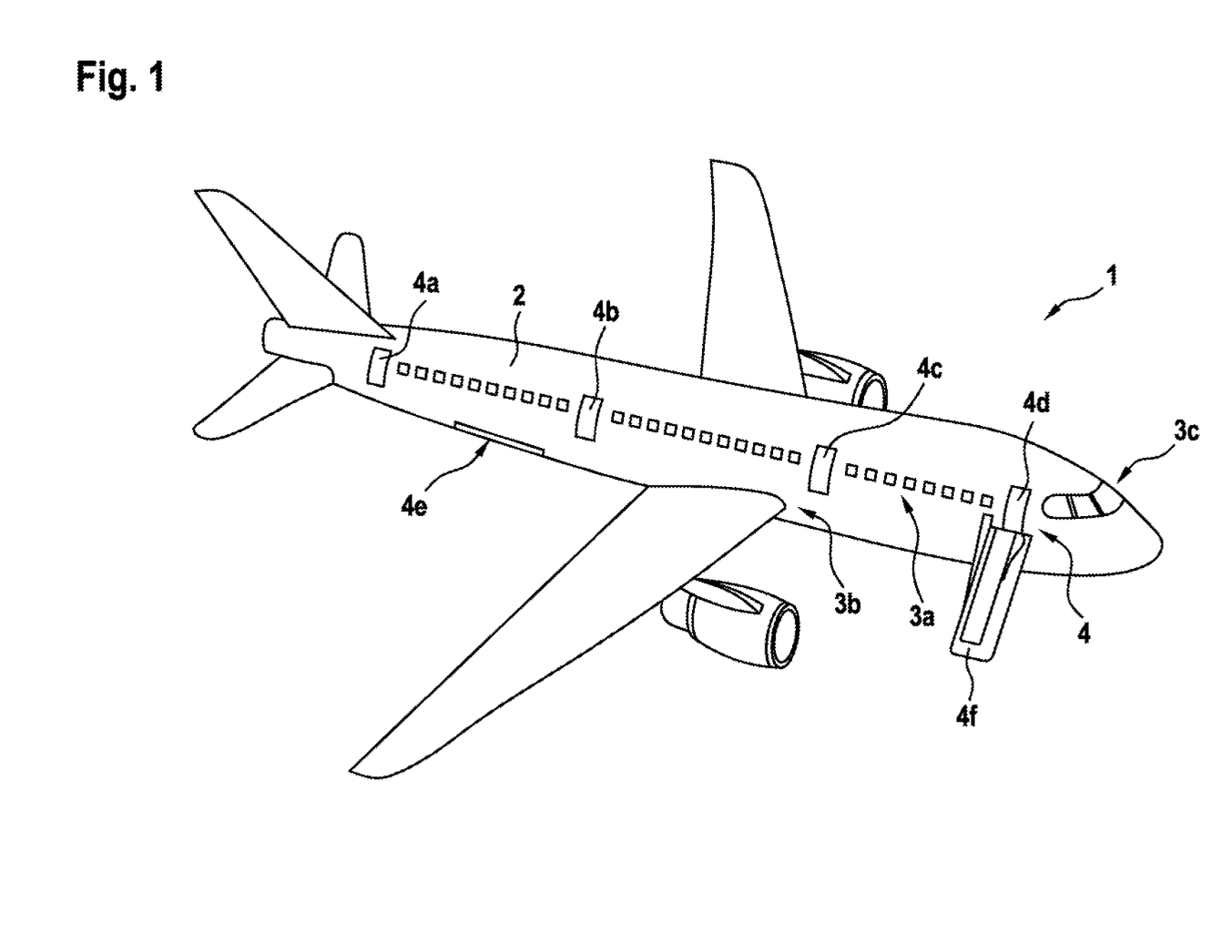
FIG. 1 shows a perspective view of an aircraft having an aircraft door and an information projection and control system according to the present invention.

FIG. 1 shows an aircraft 1 with an aircraft airframe 2. The aircraft 1 illustratively comprises a passenger cabin 3a, a cargo deck 3b and a flight deck or cockpit 3c. Preferably, the aircraft 1 is accessible via a plurality of aircraft doors 4, which exemplarily comprises several cabin access doors 4a, 4b, 4c and 4d, as well as one or more cargo deck access doors 4e. By way of example, the passenger cabin 3a and the flight deck 3c are accessible via the cabin access doors 4a, 4b, 4c and 4d, and the cargo deck 3b is accessible via the one or more cargo deck access doors 4e.

The plurality of aircraft doors 4 is preferably adapted to close the airframe, i.e. fuselage 2 of the aircraft 1, preferentially in a fluid-tight manner. According to one aspect, at least one and preferably each one of the plurality of aircraft doors 4 is associated with at least one emergency slide. However, for simplicity and clarity of the drawings only a single emergency slide 4f is shown. The emergency slide 4f is illustratively associated with the cabin access door 4d and, by way of example, shown in deployed state.

One or more of the plurality of aircraft doors 4 may be equipped with an information projection and control system (22 in FIG. 3 to FIG. 5) according to the present invention. This information projection and control system is preferably at least configured for projecting information onto a projection area (9a in FIG. 2 to FIG. 4) provided by the one or more of the plurality of aircraft doors 4.

Illustratively, the aircraft 1 is an airplane. However, the present invention is not limited to airplanes. Instead, any vehicle with vehicle doors that may be equipped with an information projection and control system according to the present invention is likewise contemplated. By way of example, the present invention may alternatively be applied to vessels, such as ships and so on. Consequently, the present invention is not limited to aircraft doors, but can likewise be applied to any arbitrary vehicle door. However, for purposes of illustration, the present invention is hereinafter described with respect to aircraft doors and, only exemplarily, with respect to aircraft cabin access doors.

Figure 2:
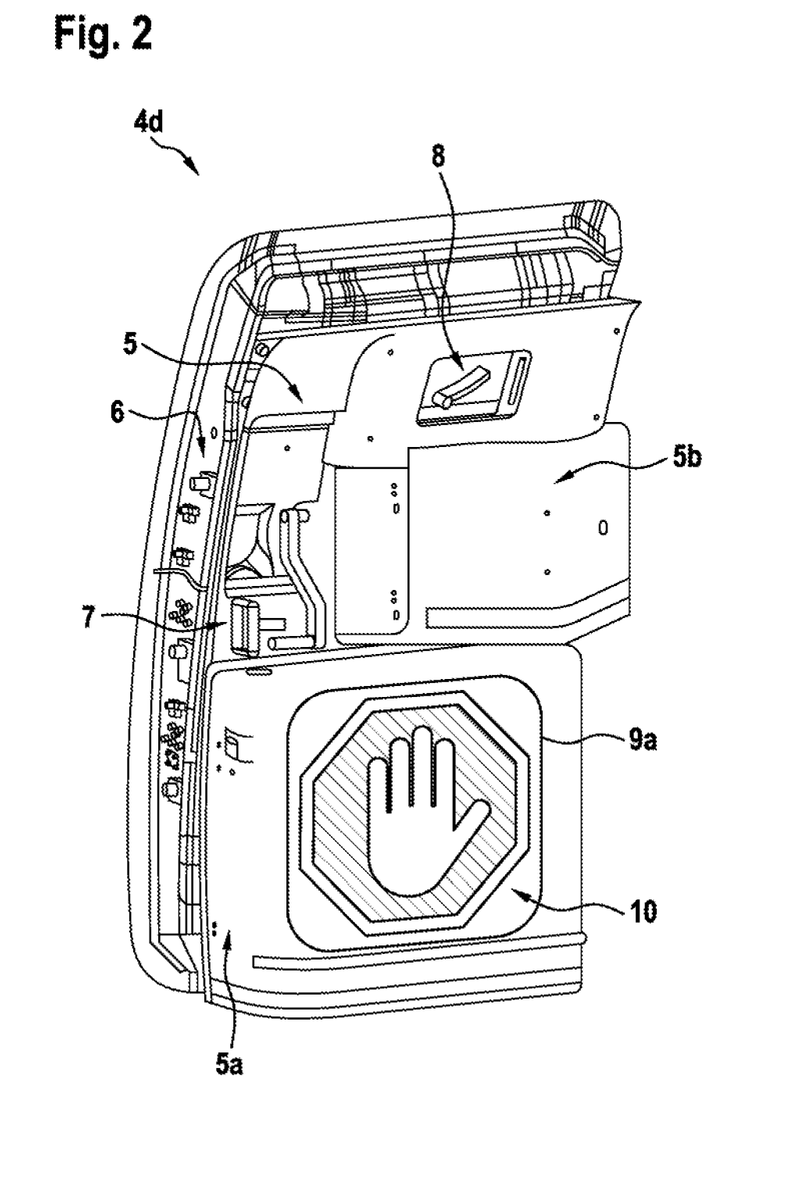
FIG. 2 shows a perspective view of the aircraft door of FIG. 1.

FIG. 2 shows the cabin access door 4d of FIG. 1, which is hereinafter described in more detail and, for simplicity, generally referred to as the "aircraft door 4d". However, it should be noted that the aircraft door 4d is merely described representatively for all cabin access doors 4a, 4b, 4c, 4d of the aircraft 1 of FIG. 1. Furthermore, it should be noted that the aircraft door 4d is even more generally only described by way of example for an arbitrary vehicle door, to which the present invention can be applied, such as e.g. the cargo deck access door 4e of FIG. 1.

According to one aspect, the aircraft door 4d comprises an associated door structure 5, which is equipped with associated blocking and locking components 6. The associated blocking and locking components 6 are preferably activatable by at least one control lever 7 for blocking and locking the aircraft door 4d in the fuselage 2 of FIG. 1 in closed state of the aircraft 1 of FIG. 1, and for unlocking and releasing the aircraft door 4d from the fuselage 2 of FIG. 1 upon transition from the closed state to an opened state of the aircraft 1 of FIG. 1, in order to enable opening of the aircraft door 4d. The at least one control lever 7 is preferably moveably mounted to the door structure 5.

Preferably, the aircraft door 4d further comprises an emergency slide activation lever 8 which is preferentially also moveably mounted to the door structure 5. The emergency slide activation lever 8 is preferably activatable to initiate deployment of the emergency slide 4f of FIG. 1.

Illustratively, the aircraft door 4d comprises one or more preferably flat surfaces, such as flat surfaces 5a, 5b. The flat surfaces 5a, 5b may be used as projection areas onto which information is projected by an information projection and control system (22 in FIG. 3 to FIG. 5) according to the present invention. By way of example, the flat surface 5a is used as a projection area 9a, onto which illustratively a warning signal 10 is projected, as described in more detail below with reference to FIG. 3.

However, it should be noted that provision and use of the flat surfaces 5a, 5b as projection areas is only described by way of example and not for limiting the present invention accordingly. Instead, any surface of the aircraft door 4d may be used for the projection of information. For instance, information may also be projected directly onto the at least one control lever 7 and/or the emergency slide activation lever 8.

Furthermore, it should be noted that the present invention is not limited to aircraft doors that are equipped with an emergency slide activation lever. In fact, the aircraft door 4d with the emergency slide activation lever 8 is merely an example of a vehicle door that may be equipped with an information projection and control system (22 in FIG. 3 to FIG. 5) according to the present invention, and wherein the latter may advantageously be employed to prevent inadvertent deployment of the associated emergency slide 4f of FIG. 1. However, as already mentioned above, the information projection and control system (22 in FIG. 3 to FIG. 5) according to the present invention may also beneficially be used with any other vehicle door in general, even e.g. with a cockpit door inside of the aircraft 1 of FIG. 1.

Figure 3:
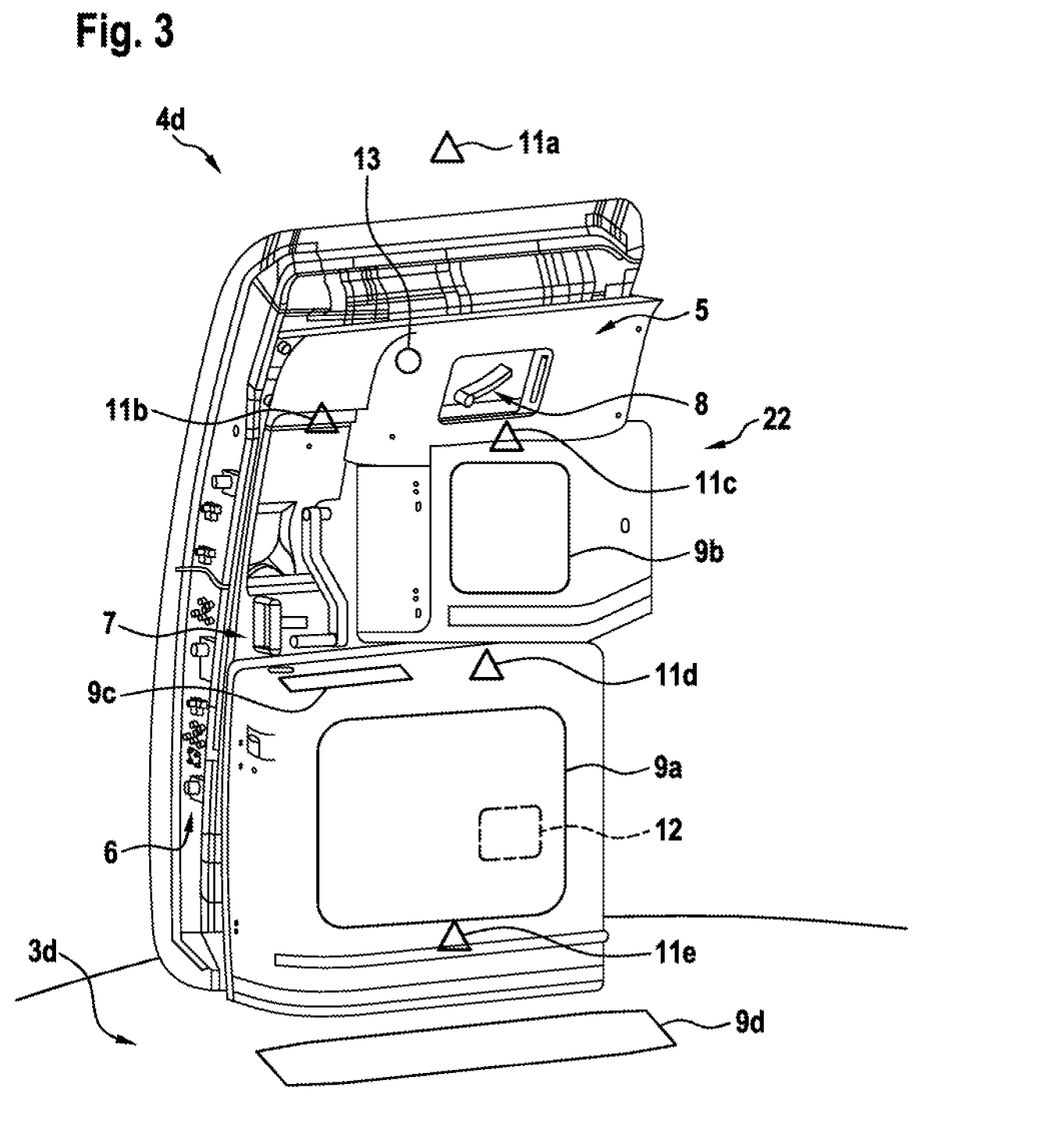
FIG. 3 shows a perspective view of the aircraft door of FIG. 1 and FIG. 2 with the information projection and control system according to the present invention.

FIG. 3 shows the aircraft door 4d of FIG. 2 with the door structure 5, the blocking and locking components 6, the at least one control lever 7, and the emergency slide activation lever 8. According to one aspect, the aircraft door 4d is associated with an information projection and control system 22 according to the present invention.

The information projection and control system 22 is preferably provided for projecting information onto one or more projection areas provided by the aircraft door 4d. By way of example, three projection areas provided by the aircraft door 4d are shown: the projection area 9a of FIG. 2, and two additional projection areas 9b, 9c.

However, it should be noted that the information projection and control system 22 is not limited to the projection of information onto the projection areas 9a, 9b, 9c provided by the aircraft door 4d, e.g. by the door structure 5. Instead, any suitable and preferably flat surfaces in the surroundings of the aircraft door 4d may likewise be used as projection areas, such as e.g. a projection area 9d illustrated on a floor 3d in front of the aircraft door 4d. The floor 3d may e.g. be a cabin floor of the aircraft 1 of FIG. 1.

According to one aspect, the information projection and control system 22 comprises at least one control unit 12 that may be mounted to the aircraft door 4d, e.g. to the door structure 5. The at least one control unit 12 is preferably provided to generate information, such as e.g. the warning signal 10 of FIG. 2, for projection onto one or more of the projection areas 9a, 9b, 9c, 9d.

The information that is generated by the at least one control unit 12 may comprise one or more of pictures, symbols, text, videos, and/or live pictures. It may be related to one or more of an aircraft door status, entertainment and advertisement, a seat number scheme, instructions for passengers of the aircraft 1 of FIG. 1, and/or operation of the aircraft door 4d. It may in addition or alternatively be related to the logo of a flight operator, charter flight, weather, travel information, e.g. connecting flights, and so on. It may in addition or alternatively be related to maintenance of the aircraft door 4d, in particular to dismantling and/or assembly instructions for the aircraft door 4d.

By way of example, the information that is generated by the at least one control unit 12 may be intended to interdict opening of the aircraft door 4d in normal operation mode of the aircraft 1 of FIG. 1 as long as the emergency slide 4f of FIG. 1 is in "armed" state. Thus, an inadvertent deployment of the emergency slide 4f of FIG. 1 may advantageously be prevented.

Preferably, the information that is generated by the at least one control unit 12 is projected by one or more projection devices onto one or more of the projection areas 9a, 9b, 9c, 9d. According to one aspect, the one or more projection devices permanently project information onto one or more of the projection areas 9a, 9b, 9c, 9d during operation of the aircraft 1 of FIG. 1.

The at least one control unit 12 may be adapted to adjust projection parameters of one or more of the projection devices. In particular, the at least one control unit 12 may be adapted to adjust color, contrast and/or brightness of one or more of the projection devices, dependent on respective environmental conditions currently prevailing in respective surroundings of the aircraft door 4d, in particular visibility and luminosity.

By way of example, five projection devices 11a, 11b, 11c, 11d, 11e are provided. Preferably, at least one of the five projection devices 11a, 11b, 11c, 11d, 11e is mounted to the aircraft door 4d, e.g. to the door structure 5.

More specifically, each one of the projection devices may be associated with one of the projection areas to project information that is generated by the at least one control unit 12 only onto that projection area. For instance, the projection device 11b may be provided for projection on the projection area 9c, the projection device 11c may be provided for projection on the projection area 9b, the projection device 11d may be provided for projection on the projection area 9a, and the projection device 11e may be provided for projection on the projection area 9d. Each one of the projection devices 11b, 11c, 11d, 11e may be equipped with suitable correction features for being able to project on non-orthogonal surfaces, so that each one of the projection devices 11b, 11c, 11d, 11e may be installed in very low distance to its associated projection area 9c, 9b, 9a, 9d.

Deviating therefrom, the projection device 11a may e.g. be provided for projection onto any freely selectable area of the aircraft door 4d or its surroundings, as required. By way of example, the projection device 11a may be used for projecting information onto the at least one control lever 7 or the emergency slide activation lever 8, and so on.

However, it should be noted that provision of a given number of projection areas does not require provision of an identical number of projection devices. In fact, a given projection device is usually suitable for projection in good quality on more than one projection area.

According to one aspect, the information projection and control system 22 further comprises at least one camera 13 that is adapted to monitor respective surroundings of the aircraft door 4d. A respective video signal that is produced by the at least one camera 13 may e.g. be displayed in a cockpit of the aircraft 1 of FIG. 1 such that a current status of the aircraft door 4d may reliably be monitored.

Figure 4:
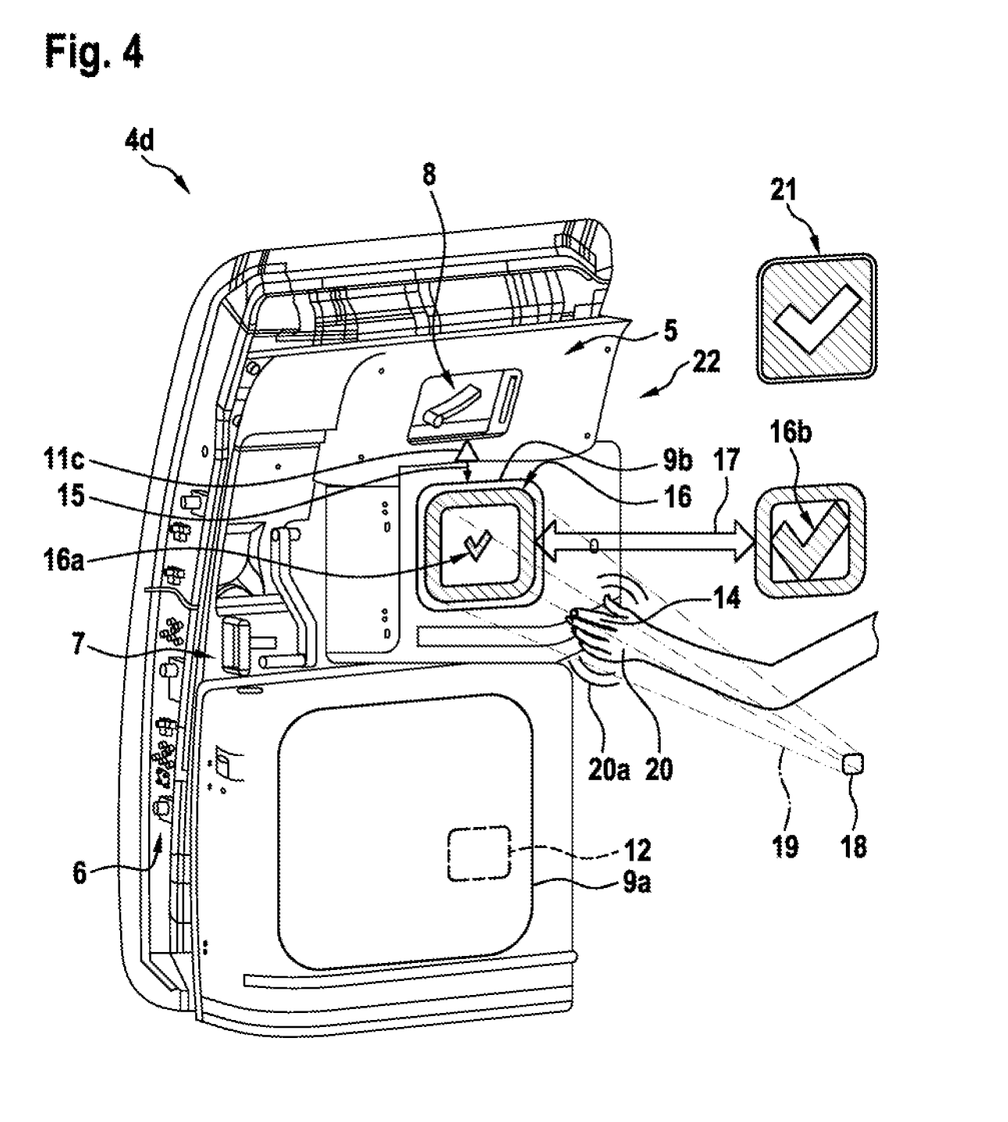
FIG. 4 shows a perspective view of the aircraft door of FIG. 3 with a movement sensor according to the present invention.

FIG. 4 shows the aircraft door 4d of FIG. 3 with the door structure 5, the blocking and locking components 6, the at least one control lever 7, the emergency slide activation lever 8, the at least one control unit 12, and the information projection and control system 22. However, for simplicity and clarity of FIG. 4, only the projection device 11c and the projection areas 9a, 9b are shown, while illustration of the projection devices 11a, 11b, 11d, 11e, the projection areas 9c, 9d, and the at least one camera 13 is omitted.

In contrast to FIG. 3, the information projection and control system 22 now further comprises at least one movement sensor 18 that is configured to detect movements 20a in a predetermined sensing area 19. By way of example, the predetermined sensing area 19 is associated with the projection area 9a, but may also be associated with one or more of the other projection areas, e.g. projection area 9a. The movements 20a may e.g. be movements of one or more fingers 14 or of a complete hand 20 of an operator within the predetermined sensing area 19. Thus, a gesture control system may advantageously be implemented.

Preferably, the at least one control unit 12 is adapted to control generation of information and, more particularly, of information that is projected by one or more of the projection devices onto one or more of the projection areas, on the basis of the detected movements 20a. By way of example, the at least one control unit 12 is adapted to control generation of information that is projected by the projection device 11c onto the projection area 9b.

The at least one control unit 12 may further be adapted to control operation of the aircraft door 4d in response to the detected movements 20a. By way of example, if the blocking and locking components 6 of the aircraft door 4d are electrically operable, they may be operated electrically in response to the detected movements 20a. At least in the case where the aircraft door 4d is electrically operable, the at least one control unit 12 may be adapted to prevent opening of the aircraft door 4d in normal operation mode of the aircraft 1 of FIG. 1 as long as the emergency slide 4f of FIG. 1 is in the "armed" state, preferably independent of the detected movements 20a.

According to one aspect, the at least one control unit 12 is not only connected to the aircraft door 4d, but also to at least one other aircraft door, e.g. one or more of the aircraft doors 4a, 4b, 4c of FIG. 1. In this configuration, the at least one control unit 12 may be adapted to generate information related to the aircraft door 4d for display on one or more of the aircraft doors 4a, 4b, 4c of FIG. 1, and vice versa.

Hereinafter, an exemplary operation of the information projection and control system 22 is described in detail, for further illustrating the functioning of the information projection and control system 22. The exemplary operation starts with activation of the information projection and control system 22.

Upon activation of the information projection and control system 22, the at least one control unit 12 starts to generate information for projection onto one or more of the projection areas of the at least one aircraft door 4d. By way of example, the at least one control unit 12 generates information for projection onto the projection area 9b.

This information that is generated by the at least one control unit 12 is then projected onto the projection area 9b using one or more of the projection devices of the information projection and control system 22. By way of example, the at least one control unit 12 drives the projection device 11c such that the latter projects the generated information onto the projection area 9b, as illustrated with an arrow 15. In the illustrated example, the generated information represents an operating indication 16.

Assuming now that the operating indication 16 is intended to prompt an operator to move with his hand 20 inside of the sensing area 19 in order to activate a predefined function of the aircraft door 4d. Accordingly, the operating indication 16 may e.g. consist of a check box with a central hook, which alternates or zooms between a small size 16a and a huge size 16b, as illustrated with an arrow 17. The frame and the hooks 16a, 16b may, for instance, be in green color. However, other realizations are likewise possible as described above with reference to FIG. 3, such as e.g. a text message etc., and are, therefore, likewise contemplated.

The sensing area 19 is monitored by the at least one movement sensor 18. More specifically, the information projection and control system 22 uses the at least one movement sensor 18 to detect movements in the sensing area 19. Accordingly, in the given example the at least one movement sensor 18 detect the movements 20a of the operator's hand 20 in the sensing area 19. This detection is reported to the at least one control unit 12.

As a result, the at least one control unit 12 controls at least generation of the generated information on the basis of the detected movements 20a. In the present example, the detected movements 20a of the operator's hand 20 inside of the sensing area 19 are assumed as being intended to activate the predefined function of the aircraft door 4d. Accordingly, the at least one control unit 12 exemplarily generates new information for projection onto the projection area 9b of the at least one aircraft door 4d. This new information illustratively represents a confirmation 21 of successful operation of the aircraft door 4d, i.e. a confirmation of successful activation of the predefined function. By way of example, the confirmation 21 may consist of a static huge hook, which may e.g. be white in a green field.

According to one aspect, the at least one control unit 12 may further initiate performance of the predefined function. For instance, if the aircraft door 4d is electrically operable and if the predefined function consists in unlocking and releasing the blocking and locking components 6 in order to enable opening of the aircraft door 4d, then the at least one control unit 12 may initiate unlocking and releasing of the blocking and locking components 6.

Figure 5:
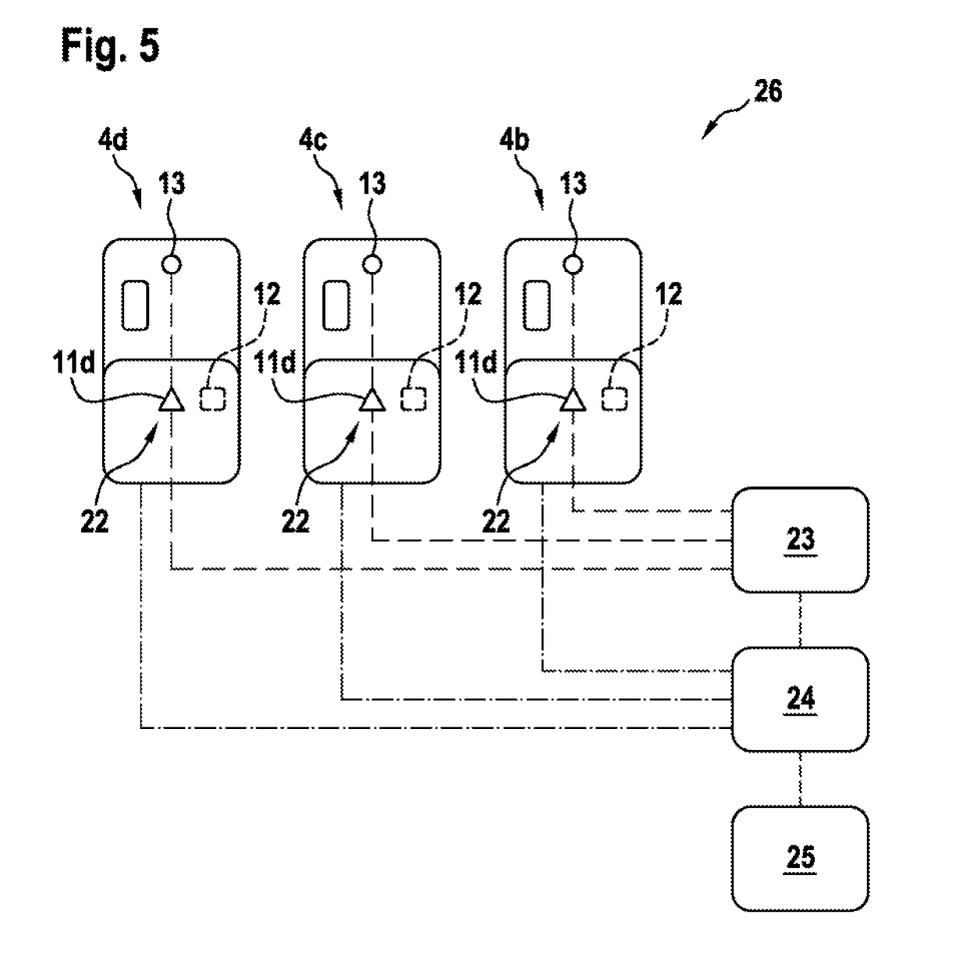
FIG. 5 shows a schematic view of a plurality of aircraft doors that are connected to an aircraft doors management system according to the present invention.

FIG. 5 shows the aircraft door 4d of FIG. 3 and FIG. 4 with the at least one control unit 12, the at least one camera 13, and the information projection and control system 22. However, for simplicity and clarity of FIG. 5, only the projection device 11d is shown, while illustration of the projection devices 11a, 11b, 11c, 11e, the projection areas 9a, 9b, 9c, 9d, the emergency slide activation lever 8, the at least one control lever 7, the blocking and locking components 6, and the door structure 5 is omitted.

In contrast to FIG. 3 and FIG. 4, the aircraft door 4d is now connected to a central aircraft door and emergency slide control unit 24 together with one or more other aircraft doors. Illustratively, the aircraft doors 4b, 4c of the aircraft 1 of FIG. 1, which are preferably configured similar to the aircraft door 4d, are representatively also connected to the central aircraft door and emergency slide control unit 24. The aircraft door 4a of FIG. 1, which is preferably also configured similar to the aircraft door 4d, may also be connected to the central aircraft door and emergency slide control unit 24, but was omitted for purposes of simplicity and clarity.

It should be noted that with reference to FIG. 2 it is already mentioned that the aircraft door 4d is merely described representatively above for all aircraft doors 4a, 4b, 4c, 4d of the aircraft 1 of FIG. 1. In other words, all aircraft doors 4a, 4b, 4c, 4d are preferably configured as described above with reference to FIG. 2 to FIG. 4 with respect to the aircraft door 4d. Accordingly, each one of the aircraft doors 4a, 4b, 4c illustratively comprises similar to the aircraft door 4d besides others the projection device 11d, the at least one control unit 12, and the at least one camera 13.

According to one aspect, the projection device 11d and the at least one camera 13 of each one of the aircraft doors 4b, 4c, 4d is connected to a central projection device control unit 23. Thus, the information that is e.g. intended for projection by the projection device 11d of each one of the aircraft doors 4b, 4c, 4d may be generated by the at least one control unit 12 of each one of the aircraft doors 4b, 4c, 4d, or by the central projection device control unit 23. In particular, the central projection device control unit 23 may e.g. drive one or more of the projection devices 11d on the basis of video images from one of the cameras 13. For instance, the central projection device control unit 23 may drive the projection devices 11d of the aircraft doors 4b, 4c such that they project video images captured by the at least one camera 13 of the aircraft door 4d. Thus, the aircraft door 4d and its surroundings may be monitored from the other aircraft doors 4b, 4c. Likewise, the central projection device control unit 23 may e.g. drive the projection device 11d of the aircraft door 4d such that it projects video images captured by the at least one camera 13 of the aircraft door 4b and/or the aircraft door 4c. Thus, the aircraft door 4b and/or 4c and their surroundings may be monitored from the aircraft door 4d.

According to one aspect, the central projection device control unit 23 and the aircraft door and emergency slide control unit 24 may be implemented by an already existing aircraft data system 25. More generally, the central projection device control unit 23 and the aircraft door and emergency slide control unit 24 may at least be controlled by an already existing aircraft data system 25. Thus, any information that is available to the already existing aircraft data system 25 may be processed for projection onto one of the aircraft doors 4b, 4c, 4d.

Preferably, at least the central projection device control unit 23 and the aircraft door and emergency slide control unit 24 together with all information projection and control systems 22 and the aircraft doors 4b, 4c, 4d form an aircraft doors management system 26.

It should be noted that modifications to the above described embodiments are within the common knowledge of the person skilled in the art and, thus, also considered as being part of the present invention. For instance, the projection devices of the information projection and control system according to the present invention may be configured such that respective projection devices project visible light symbols/effects directly on levers of an aircraft door, e.g. a flashing red cross over a control lever which should not be operated, or e.g. green arrows, check marks or "OK" letters on a control lever that can be operated, and so on. Furthermore, movements that are detected by the movement sensor of the information projection and control system according to the present invention, i.e. gestures at a defined position/place, may generally be used e.g. as confirmation of a showed instruction or warning, or to trigger or stop any electrified feature of an electrically operable aircraft door. Furthermore, the information projection and control system according to the present invention may also be provided with voice control features. Moreover, the information projection and control system according to the present invention may be implemented using an artificial intelligence platform. Such an artificial intelligence platform may advantageously improve adequacy and accuracy of the information projection and control system and enable implementation of features going beyond mere gesture control, such as e.g. the voice control features and so on. Finally, the control unit of each aircraft door may be installed in the door itself, in the door surrounding area and also anywhere else in the door surrounding area.

REFERENCE LIST 1 aircraft
2 aircraft airframe
3a aircraft passenger cabin
3b aircraft cargo deck
3c aircraft flight deck
3d cabin floor
4 plurality of aircraft doors
4a, 4b, 4c, 4d cabin access doors
4e cargo deck access door 4f emergency slide
5 door structure
5a, 5b flat door surfaces
6 door blocking and locking components
7 control levers
8 emergency slide activation lever
9a, 9b, 9c, 9d projection areas
10 projected warning signal
11a, 11b, 11c, 11d, 11e projection devices
12 projection device control unit
13 camera
14 finger
15 projection
16 projected operating indication
16a, 16b alternating projected indication
17 alternation
18 movement sensor
19 sensing area
20 operator's hand
20a hand movement
21 projection of confirmation of successful operation
22 information projection and control system
23 central projection device control unit
24 aircraft door and emergency slide control unit
25 aircraft data systems
26 aircraft doors management system

What is claimed is:

1. An information projection and control system for projecting information onto a projection area provided by a vehicle door of a vehicle, the projection area being inside of the vehicle, comprising:
   at least one control unit that generates information for projection onto the projection area inside of the vehicle,
   at least one projection device that projects the generated information onto the projection area inside of the vehicle, and
   at least one movement sensor that detects movements inside of the vehicle in a sensing area associated with the projection area inside of the vehicle, wherein the at least one control unit is adapted to control generation of the generated information on the basis of the detected movements inside of the vehicle and the at least one control unit is further adapted to adjust color, contrast, and/or brightness of the at least one projection device dependent on visibility and luminosity currently prevailing in respective surroundings of the vehicle door.

2. The information projection and control system of claim 1,
   wherein the at least one control unit is further adapted to control operation of the vehicle door in response to the detected movements.

3. The information projection and control system of claim 1, wherein the at least one projection device is mounted to the vehicle door.

4. The information projection and control system of claim 1,
   wherein the generated information comprises at least one of pictures, symbols, text, videos, or live pictures.

5. The information projection and control system of claim 1,
   wherein the generated information is related to at least one of a vehicle door status, entertainment and advertisement, a seat number scheme, instructions for passengers, or operation of the vehicle door.

6. The information projection and control system of claim 1,
   wherein the generated information is related to maintenance of the vehicle door including dismantling and/or assembly instructions for the vehicle door.

7. The information projection and control system of claim 1, further comprising:
   at least one camera that is adapted to monitor respective surroundings of the vehicle door.

8. The information projection and control system of claim 1,
   wherein the vehicle door comprises associated blocking and locking components which are electrically operable in response to the detected movements.

9. The information projection and control system of claim 1,
   wherein the at least one control unit is connected to at least one first vehicle door and one second vehicle door and is adapted to generate information related to the first vehicle door for display on the second vehicle door.

10. The information projection and control system of claim 1,
    wherein the vehicle is an aircraft, and the vehicle door is a cabin access door of the aircraft.

11. The information projection and control system of claim 10,
    wherein the aircraft door is associated with an emergency slide, and wherein the generated information is intended to interdict opening of the aircraft door in normal operation mode of the aircraft as long as the emergency slide is in armed state.

12. The information projection and control system of claim 11,
    wherein the at least one control unit is adapted to prevent the opening of the aircraft door in normal operation mode of the aircraft as long as the emergency slide is in the armed state, independent of the detected movements.

13. An aircraft with comprising:
    at least one aircraft door; and
    at least one information projection and control system for projecting information onto a projection area provided by the at least one aircraft door, the projection area being inside of the aircraft, each information projection and control system including:
       at least one control unit that generates information for projection onto the projection area inside of the aircraft,
       at least one projection device that projects the generated information onto the projection area inside of the aircraft, and
       at least one movement sensor that detects movements inside of the aircraft in a sensing area associated with the projection area inside of the aircraft, wherein the at least one control unit is adapted to control generation of the generated information on the basis of the detected movements inside of the aircraft and the at least one control unit is further adapted to adjust color, contrast, and/or brightness of the at least one projection device dependent on visibility and luminosity currently prevailing in respective surroundings of the aircraft door.

14. A method of operating an information projection and control system associated with at least one aircraft door of an aircraft, wherein the information projection and control system includes at least one control unit, at least one projection device, and at least one movement sensor, the method comprising:

using the at least one control unit of the information projection and control system to generate information for projection onto a projection area of the at least one aircraft door inside of the aircraft, using the at least one projection device of the information projection and control system to project the generated information onto the projection area of the at least one aircraft door inside of the aircraft, using the at least one movement sensor of the information projection and control system to detect movements inside of the aircraft in a sensing area associated with the projection area of the at least one aircraft door inside of the aircraft, controlling, by the at least one control unit, generation of the generated information on the basis of the detected movements inside of the aircraft, and adjusting, by the at least one control unit, color, contrast, and/or brightness of the at least one projection device dependent on visibility and luminosity currently prevailing in respective surroundings of the at least one aircraft door.

\* \* \* \* \*